(12) United States Patent
Isozu et al.

(10) Patent No.: US 8,578,415 B2
(45) Date of Patent: Nov. 5, 2013

(54) INFORMATION PROVIDING METHOD, CONTENT DISPLAY TERMINAL, PORTABLE TERMINAL, SERVER DEVICE, INFORMATION PROVIDING SYSTEM AND PROGRAM

(75) Inventors: Masaaki Isozu, Tokyo (JP); Mitsuru Takehara, Tokyo (JP); Seishi Tomonaga, Kanagawa (JP); Atsushi Okamori, Tokyo (JP); Yuan Wei, Tokyo (JP)

(73) Assignee: Sony Corporation, Tokyo (JP)

( * ) Notice: Subject to any disclaimer, the term of this patent is extended or adjusted under 35 U.S.C. 154(b) by 212 days.

(21) Appl. No.: 13/090,181

(22) Filed: Apr. 19, 2011

(65) Prior Publication Data

US 2011/0271303 A1 Nov. 3, 2011

(30) Foreign Application Priority Data

Apr. 28, 2010 (JP) .................. P2010-103704

(51) Int. Cl.
*H04N 5/455* (2006.01)
(52) U.S. Cl.
USPC ............ 725/40; 725/37; 715/135; 715/758; 709/224; 705/51; 705/52

(58) Field of Classification Search
USPC ................ 725/40–46, 106; 709/224
See application file for complete search history.

(56) References Cited

U.S. PATENT DOCUMENTS 8,073,947 B1 * 12/2011 Yeh et al. ............... 709/224
2005/0262542 A1 * 11/2005 DeWeese et al. ......... 725/106

FOREIGN PATENT DOCUMENTS

JP 2005-332198 12/2005

* cited by examiner

*Primary Examiner* — Vivek Srivastava
*Assistant Examiner* — Anthony Bantamoi
(74) *Attorney, Agent, or Firm* — Finnegan, Henderson, Farabow, Garrett & Dunner, L.L.P.

(57) ABSTRACT

A method, apparatus, and computer-readable storage medium for providing information to a user is provided. The method includes providing, on an output device, program content, generating, by a processor, descriptive data including identification information corresponding to the program content, and providing a notification to a user based on the descriptive data, the notification corresponding to the program content.

16 Claims, 17 Drawing Sheets

FIG. 15

| PROGRAM TAG | START TIME OF TOTALING | END TIME OF TOTALING | NUMBER OF COMMENTS |
|---|---|---|---|
| #olympic2010 | 1/21 18:25 | 1/21 18:30 | 87 |
| #quiz_show | 1/21 18:25 | 1/21 18:30 | 51 |
| #baseball | 1/21 18:25 | 1/21 18:30 | 16 |
| #news19 | 1/20 19:00 | 1/20 19:05 | 40 |
| ⋮ | ⋮ | ⋮ | ⋮ |

FIG. 16

| USER ID | PROGRAM TAG | COMMENT |
|---|---|---|
| 081055 | #olympic2010 | THIS PERFORMANCE ABSOLUTELY WINS GOLD MEDAL |
| 182443 | #olympic2010 | CARELESS MISTAKE IS ALWAYS MADE AROUND HERE |
| 200109 | #news19 | POLITICAL NEWS IS SCARCE TODAY |
| ⋮ | ⋮ | ⋮ |

INFORMATION PROVIDING METHOD, CONTENT DISPLAY TERMINAL, PORTABLE TERMINAL, SERVER DEVICE, INFORMATION PROVIDING SYSTEM AND PROGRAM

CROSS-REFERENCE TO RELATED APPLICATION

This application claims priority of Japanese Patent Application No. 2010-103704, filed on Apr. 28, 2010, the entire content of which is hereby incorporated by reference.

BACKGROUND OF

1. Technical Field

The present disclosure relates to an information providing method, a content display terminal, a portable terminal, a server device, an information providing system and a program. Particularly, the present invention relates to an information providing method, a content display terminal, a portable terminal, a server device, an information providing system and a program, for providing information regarding a content without using a specific device or a specific service.

2. Description of the Related Art

In the past, an electronic bulletin board is provided, which is capable of giving a comment regarding a content of a specific program viewed by a user. For example, Japanese Patent Application Laid-Open No. 2005-332198 discloses a technique of transmitting a comment enable program list to a portable phone, and further transmitting a screen for inputting a comment, then receiving the comment and registering it in a comment list.

Further, when remotely-situated users desire to communicate with each other regarding a content of a TV program, etc., during viewing the content of the program, the users input the name of the TV program and chat with each other.

Further, in recent years, a service of totaling "tweets" for each TV station is proposed. A tag for specifying the TV station is assigned to the tweets, to thereby specify a program based on this tag and a time necessary for the tweets.

When a comment is posted on an electronic bulletin board, it is explicitly found that the comment may be directed to a specific program. Therefore, opinions and comments on this program are easily collected. However, the comment is posted on the electronic bulletin board for the specific program and is specialized in a specific service, thus involving an issue that such a comment is poor in versatility.

Further, in a case of a chat, in order for the users to determine that communication is directed to the specific program, it is necessary that the name of the program be accurately input, to let chat friends know about it. Moreover, if different program names are input to the same programs, a mechanism of identifying them is necessary.

Further, in a case of the "tweets" for each TV station, it is difficult to accurately associate the tweets and the program name, thus involving an issue that there is no association between the tweets and the program while viewing a prerecorded broadcast in particular.

In view of the foregoing, it is desirable to provide a novel and improved information providing method, content display terminal, portable terminal, server device, information providing system and program, which can provide meta-information capable of specifying a content being viewed, without using a specific device or a specific service.

SUMMARY

As described below, consistent with the present disclosure, meta-information capable of specifying a content being viewed can be provided, without using a specific device or a specific service.

Accordingly, there is disclosed a method for providing information to a user. The method may include providing, on an output device, program content; generating, by a processor, descriptive data including identification information corresponding to the program content; and providing a notification to a user based on the descriptive data, the notification corresponding to the program content.

In accordance with an embodiment, there is provided an apparatus for providing information to a user. The apparatus may include an output device for providing program content; and a processor for generating descriptive data including identification information corresponding to program content; and providing a notification to a user based on the descriptive data, the notification corresponding to the program content.

In accordance with an embodiment, there is provided an apparatus for providing information to a user. The apparatus may include a memory device storing instructions; a processing unit executing the instructions to receive descriptive data including identification information corresponding to a program content, wherein the descriptive data is generated by a device outputting the program content; and a communication unit for sending user data conveying a comment of the user corresponding to the program content, the user data including the identification information.

In accordance with an embodiment, there is provided a tangibly embodied non-transitory computer-readable storage medium comprising instructions, which when executed on a processor, cause the processor to perform a method for providing information to a user. The method may include providing program content; generating descriptive data including identification information corresponding to the program content; and providing a notification to a user based on the descriptive data, the notification corresponding to the program content.

In accordance with an embodiment, there is provided an apparatus for receiving user data. The apparatus may include a memory device storing instructions: a processing unit executing the instructions to receive user data and descriptive data including identification information corresponding to a program content, the user data conveying comments of a plurality of users corresponding to the program content; a summation unit calculating a summation result based on comments of the plurality users corresponding to the program content; a comparison unit for comparing the summation result with a predetermined summation result; and an output unit outputting a result of the comparison.

BRIEF DESCRIPTION OF THE DRAWINGS

FIG. 15 is an example of a database storing totaling results of the number of comments for each tag consistent with this embodiment;

FIG. 16 is another example of the database storing the comments for each tag consistent with this embodiment;

DETAILED DESCRIPTION OF THE EMBODIMENT

Figure 1:
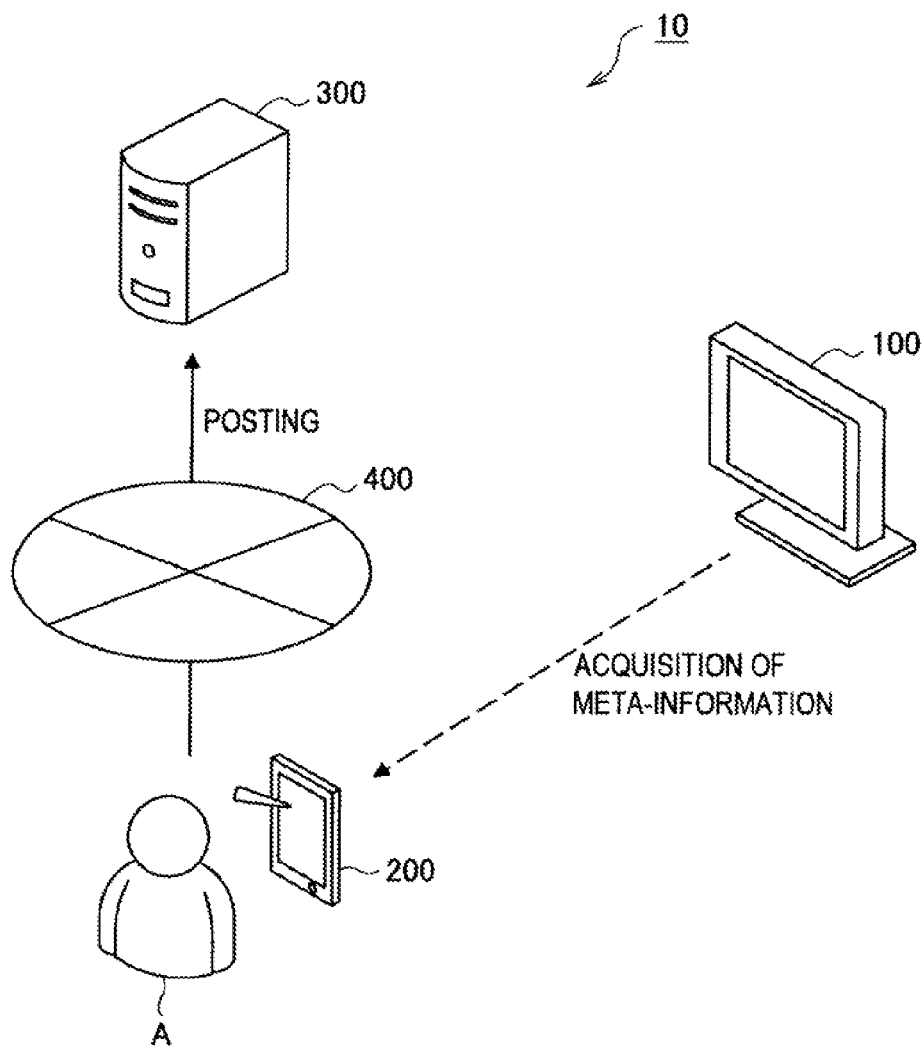
FIG. 1 is a block diagram of an information providing system consistent with an embodiment of the present invention.

Hereinafter, embodiments of the present invention will be described in detail with reference to the appended drawings. Note that, in this specification and the appended drawings, structural elements that have substantially the same function and structure are denoted with the same reference numerals, and repeated description of these structural elements is omitted.

This embodiment will be described in the following order.
[Overall Structure of the Information Providing System)]
[Functional Structure of the Content Display Terminal (TV)]
[Function of the Functional Structure of the Portable Terminal]
[Functional Structure of the Server Device]
[Operation of the Information Providing System (With Radio Communication)]
[Operation of the Information Providing System (Without Radio Communication)]
[Operation of the Content Display Terminal (TV)]
(Generation Example of Tag)
(Display Example of Tag)
(Distribution Example of Tag)
[Operation of the Portable Terminal]
(Input Examples of Comment and Tag)
[Operation of the Server Device]
(Display Example of the Totaling Results)
(Addition of Time Information)
[Overall Structure of the Information Providing System]

The overall structure of the information providing system consistent with an embodiment of the present invention will be described with reference to FIG 1. In recent years, performance of transmitting a comment (i.e., user data) by using the portable terminal while viewing TV has been increased. An information providing system 10 consistent with this embodiment can transmit the comment regarding the content (i.e., program content) being viewed at present by a user, or can perform totalizing of a viewing situation of the user without using a specific device or service. That is, in the information providing system 10 consistent with this embodiment, meta-information (i.e., descriptive data) uniquely showing ID (i.e., identification information) or the content of the program is transmitted (i.e., notification), and therefore the meta-in formation can be used, for example, by mail or website without using the specific device or the specific service.

The information providing system 10 consistent with this embodiment has a TV 100, a portable terminal 200, and a server device 300. FIG. 1 shows a situation where a user A posts a comment by using the portable terminal 200 while viewing the TV 100. In the information providing system 10 consistent with this embodiment, the meta-information of the content transmitted from the TV 100 is received by the portable terminal 200. The user inputs the comment regarding the program being broadcasted by the TV 100 and posts the comment on the server device 300 via a network 400 together with the meta-information.

The TV 100 is an example of the content display terminal, and the content display terminal is not necessarily limited thereto, and a recorder, etc., may also be used. Either one of a network connection type terminal with a function of radio communication, and other terminal without a function of radio communication may be used as a reproduction content display terminal. For example, if the TV 100 itself has a function as an Internet terminal, the TV 100 and the portable terminal 200 can be formed integrally. Various devices such as a PC, a mobile phone, a portable game machine can be used as the portable terminal 200.

The TV 100 distributes the meta-information of the TV program being viewed at present. The TV program is an example of the content, and any kind of contents including contents recorded in a recorder, contents being broadcasted or already broadcasted, and contents such as a moving picture distribution program, are included therein. Therefore, this embodiment can be applied not only to a content broadcasted in real time, but also to a recorded content.

The portable terminal 200 provides a method of communicating with each other by users based on interests of the users in the program, by posting the comment regarding the program using the meta-information distributed from the TV 100. The server device 300 provides a using method of totaling a degree of interest of each user in the program for each meta-information, and recommending a popular content to the user based on a totaling result.

Figure 2:
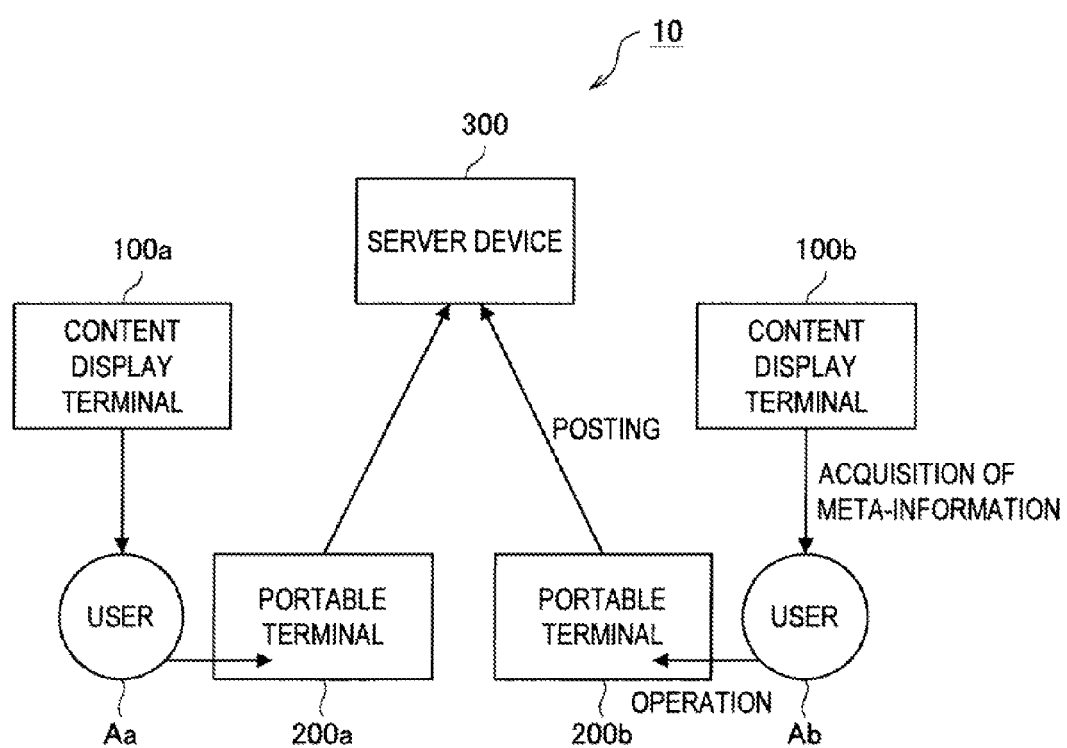
FIG. 2 is a modified example of the entire block diagram of the information providing system consistent with this embodiment.

Note that there is a possibility that a plurality of users who possess the portable tensional 200 connected to the network 400 utilize the server device 300. The information providing system 10 shown in FIG. 2 is a modified example of the information providing system 10 shown in FIG. 1. FIG. 2 is a view schematically showing a state that portable terminals 200*a* and 200*b* of two users A*a* and A*b* are simultaneously accessing the server device 300. In the information providing system 10, the number of the portable terminals 200*a* and 200*b* connected to the server device 300 is not necessarily two. Further, it might be also possible that TVs 100*a* and 100*b* are directly connected to the server device 300, not through the portable terminals 200*a* and 200*b*.

A structure and an operation of each device will be described hereafter sequentially. Note that TV program information is taken as an example of the meta-information. However, any information capable of specifying the content may be used as the meta-information. A method of generating the meta-information will be described later.

[Functional Structure of the Content Display Terminal (TV)]

Figure 3:
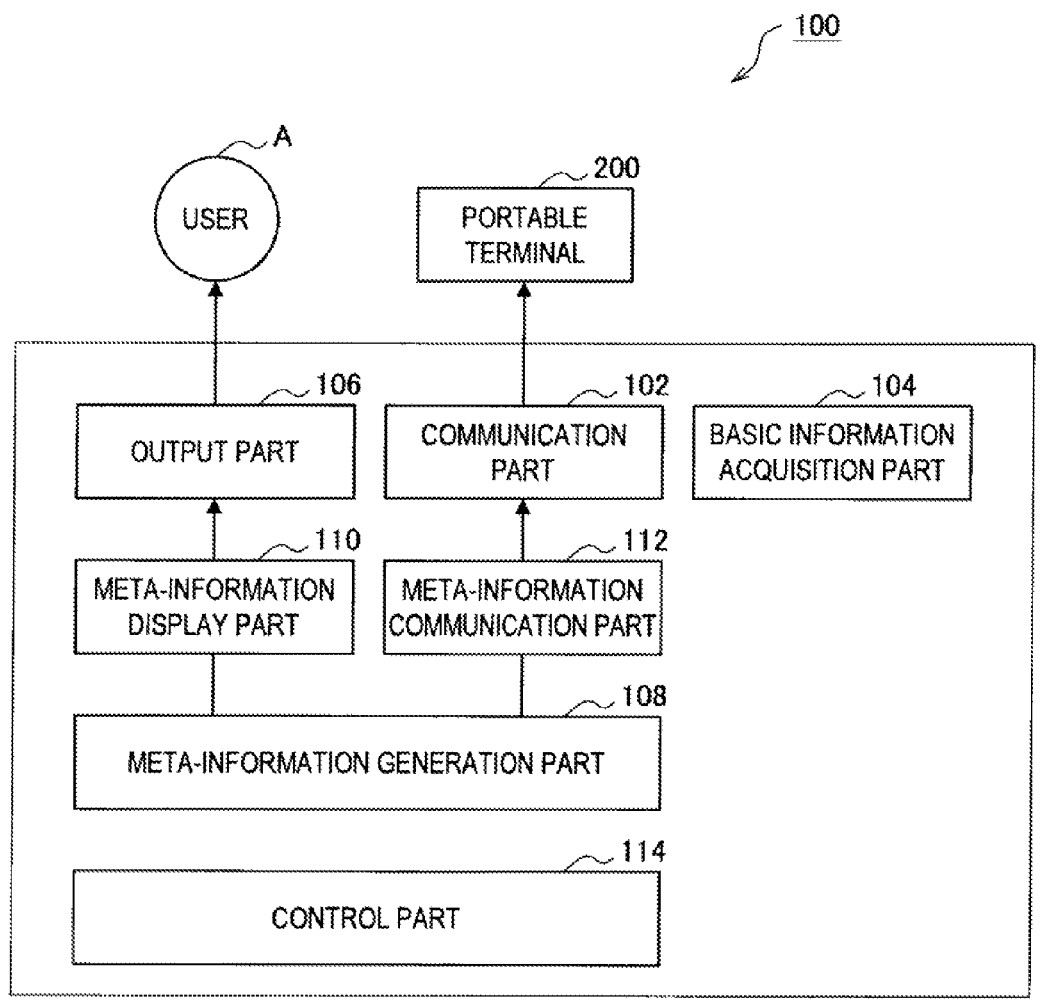
FIG. 3 is a block diagram of an inside of a content display terminal (TV) consistent with this embodiment.

An internal stricture of the TV 100, being the content display device, will be described with reference to a functional block diagram of FIG. 3. The TV 100 includes a communication part 102, a basic information acquisition part 104, an output part 106, a meta-information generation part 108, a meta-information display part 110, a meta-information notification part 112, and a control part 114.

The communication part 102 incorporates a radio network interface such as Wi-Fi (registered trademark), ZigBee (registered trademark) or Bluetooth (registered trademark). The basic information acquisition part 104 acquires basic information regarding the content displayed on a display screen of the TV 100.

The output part 106 displays a program on a display. The meta-information generation part 108 generates meta-information from the information regarding the program. The meta-information is the information capable of specifying the content, and is the information for specifying the TV program in this embodiment. As an example, when http://www.SSStv.com/quiz_show is input, as an address for accessing the information regarding the TV program, "#SSStv-quiz_show" is output as the meta-information. "SSStv" indicates a TV station, and "quiz_show" indicates a quiz program. Thus, the TV program can be specified by the meta-information.

The meta-in formation display part 110 displays the generated meta-information on the display of the output part 106. The meta-information notification part 112 transmits the meta-information to the portable terminal 200 through the communication part 102. The control part 114 controls all blocks. Note that the meta-information display part 110 and the meta-information communication part 112 have functions included in a meta-information disclosure pan (not shown).

[Functional Structure of the Portable Terminal]

Figure 4:
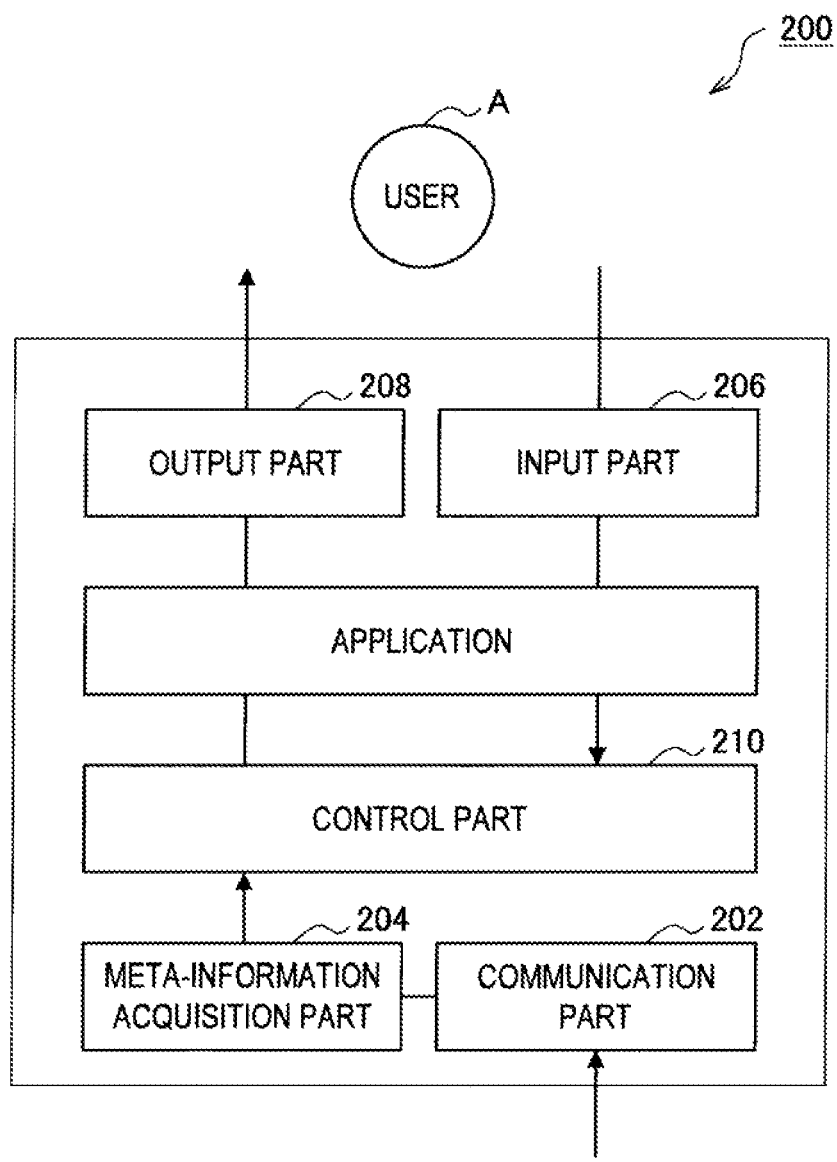
FIG. 4 is a block diagram of an inside of a portable terminal consistent with this embodiment.

Next, the internal structure of the portable terminal 200 will be described with reference to a functional block diagram of FIG. 4. The portable terminal 200 has a communication part 202, a meta-information acquisition part 204, an input part 206, an output part 208, and a control part 210.

The communication part 202 performs data communication via the network 400. The communication part 202 has a device capable of communicating with the TV 100, and incorporates the radio network interface such as Wi-Fi (registered trademark), ZigBee (registered trademark), or Bluetooth (registered trademark).

The meta-information acquisition part 204 analyzes and acquires tile meta-information. The meta-information acquisition part 204 is a part for converting the meta-information received by the communication part 202 to a form so as to understand an application. For example, the meta-information acquisition part 204 performs processing similar to a reverse conversion of tag generation as described above, to thereby convert the meta-information to the information so that the user can understand the TV program specified by the tag.

A keyboard and a touch panel are provided in the input part 206. The input part 206 inputs the comment regarding the displayed TV program, consistent with an input operation of the user. A display and a speaker are provided in the output part 208. Te output part 208 outputs the input comment to the server device 300, together with the meta-information.

The application is a program group used for performing communication by users using the meta-information. As an example of the application, a function of posting on the server device 300 the comment regarding the TV program based on the meta-information, can be assumed. The control part controls all modules.

[Functional Structure of the Server Device]

Figure 5:
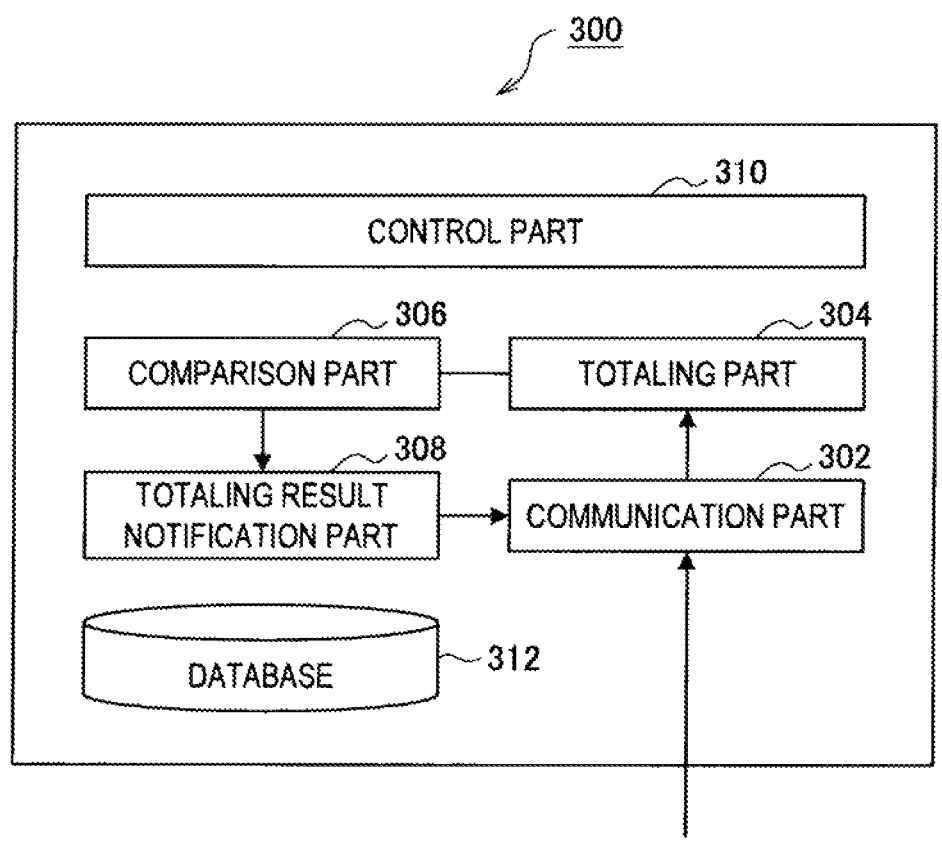
FIG. 5 is a block diagram of an inside of a server device consistent with this embodiment.

Next, the internal structure of the server device 300 will be described with reference to a functional block diagram of FIG. 5. The server device 300 includes a communication part 302, a totaling part 304, a comparison part 306, a totaling result notification part 308, a control part 310, and a database 312.

The communication part 302 receives the meta-information transmitted from the portable terminal 200 and the comment regarding the content.

The totaling part 304 performs totaling of the number of comments for each meta-information based on the transmitted meta-information and comment. Totaling results are stored in the database 312 (see FIG. 15). The database 312 may be provided either inside or outside the server device 300.

The comparison part 306 compares the number of comments totaled for each meta-information, and the number of comments totaled in the past for each meta-information.

The totaling result notification part 308 displays the meta-information on the display screen of the TV 100 or transmits the meta-information via the network, together with the comment to a user which is generated consistent with the result of the comparison. The control part 310 controls all blocks.

Note that a command to each part of the aforementioned each device is executed by a dedicated control device or a CPU (not shown) for executing programs. That is, the programs for executing the operation of each device are previously stored in a storage area such as ROM or a nonvolatile memory (not shown), and a function of each part is realized by reading each program from the memory and executing the program by the CPU.

[Operation of the Information Providing System (With Radio Communication)]

Figure 6:
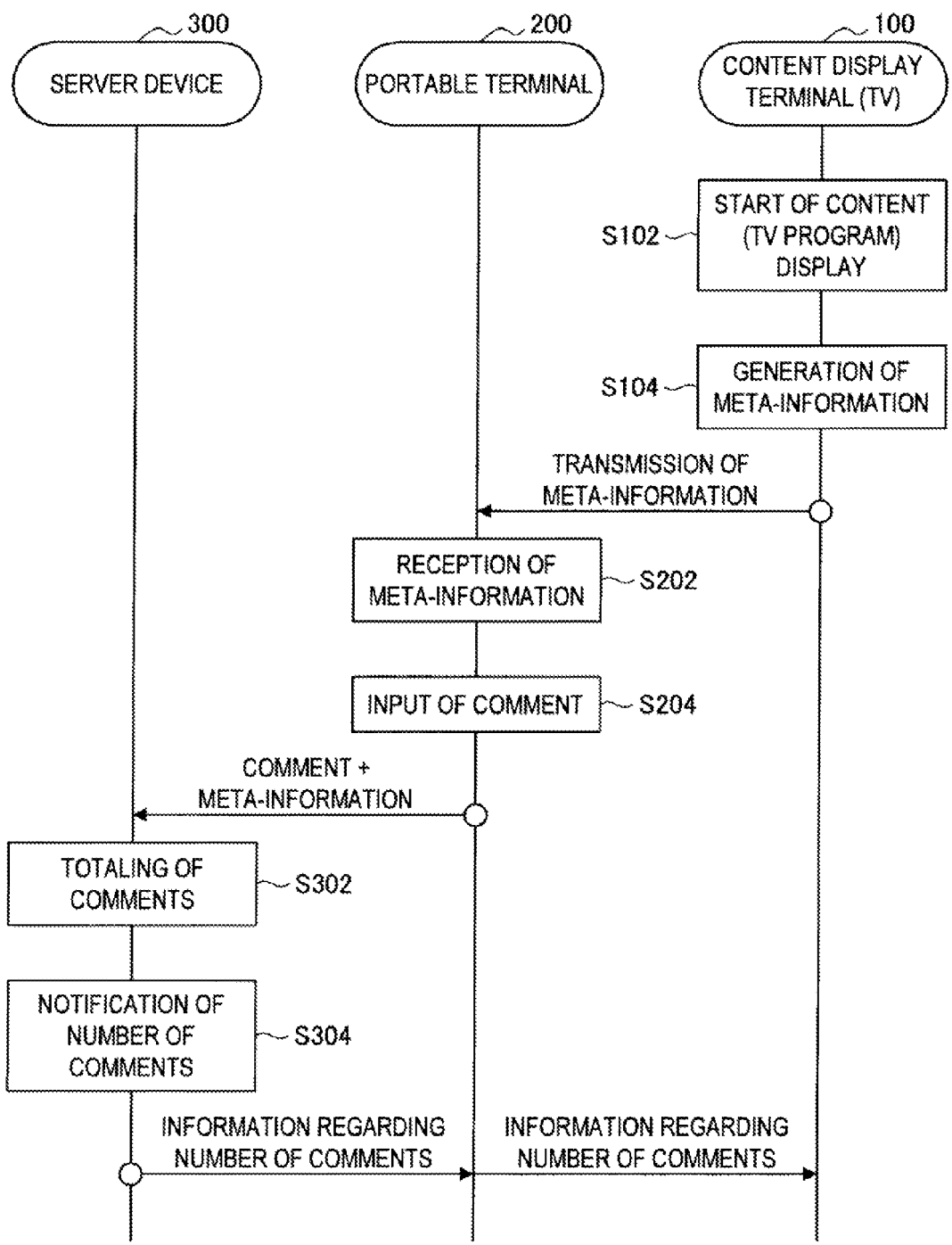
FIG. 6 is a flowchart showing an operation of the information providing system consistent with this embodiment (with radio communication)

Next, the operation of the information providing system consistent with this embodiment with radio communication will be described with reference to a flowchart of FIG. 6. When a display of the content (TV program here) is started by the content display terminal (TV 100 here) (S102), the TV 100 generates the meta-information (i.e., descriptive data) capable of specifying the TV program (i.e., program content) that starts the display (S104). The meta-information is transmitted (i.e., notification) to the portable terminal 200. The notification may be, for example, a sound signal that may be a representation of the meta-information (i.e., descriptive data).

The portable terminal 200 receives the meta-information (S202). The user who is viewing the TV program inputs the comment (i.e., user data) regarding the TV program from the portable terminal 200 (S204), and performs posting of this comment. Such a posting is performed by adding, to the comment, the meta-information capable of specifying the TV program.

The server device 300 performs totaling (i.e., summation result) of the received comments (S302), and notifies the portable terminal 200 and the TV 100 of the number of comments (S304). As such a notification, for example, recommendation of viewing a specific TV program having an increasing number of comments is given.

[Operation of the Information Providing System (Without Radio Communication)]

Figure 7:
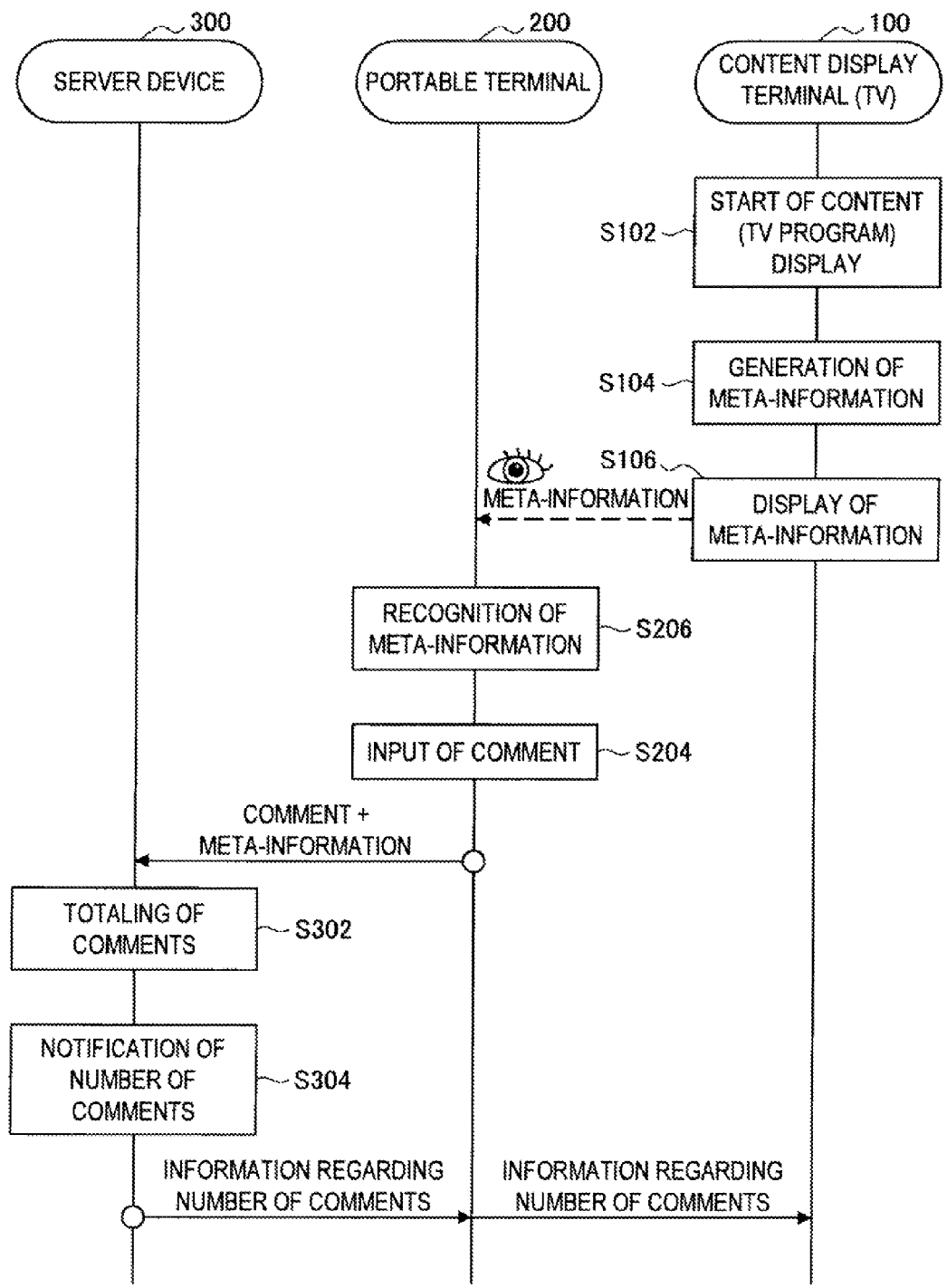
FIG. 7 is a flowchart showing the operation of the information providing system consistent with this embodiment (without radio communication)

Next, the operation of the information providing system consistent with this embodiment without radio communication will be described with reference to a flowchart of FIG. 7.

When the TV 100 starts the display of the content (TV program here) (S102), the TV 100 generates the meta-information capable of specifying the TV program that starts the display (S104). The meta-information is displayed on the screen of the TV 100 (S106).

The portable terminal 200 recognizes the meta-information displayed on the screen of the TV 100 by capturing it by a camera and the like (S206). The user who views the TV program inputs the comment regarding the TV program from the portable terminal 200, and performs posting of this comment. Such a posting is performed by adding, to the comment, the meta-information capable of specifying the TV program.

The server device 300 performs totaling of the comment (S302), and notifies the portable terminal 200 and the TV 100 of the number of comments (S304).

[Operation of the Content Display Terminal (TV)]

Figure 8:
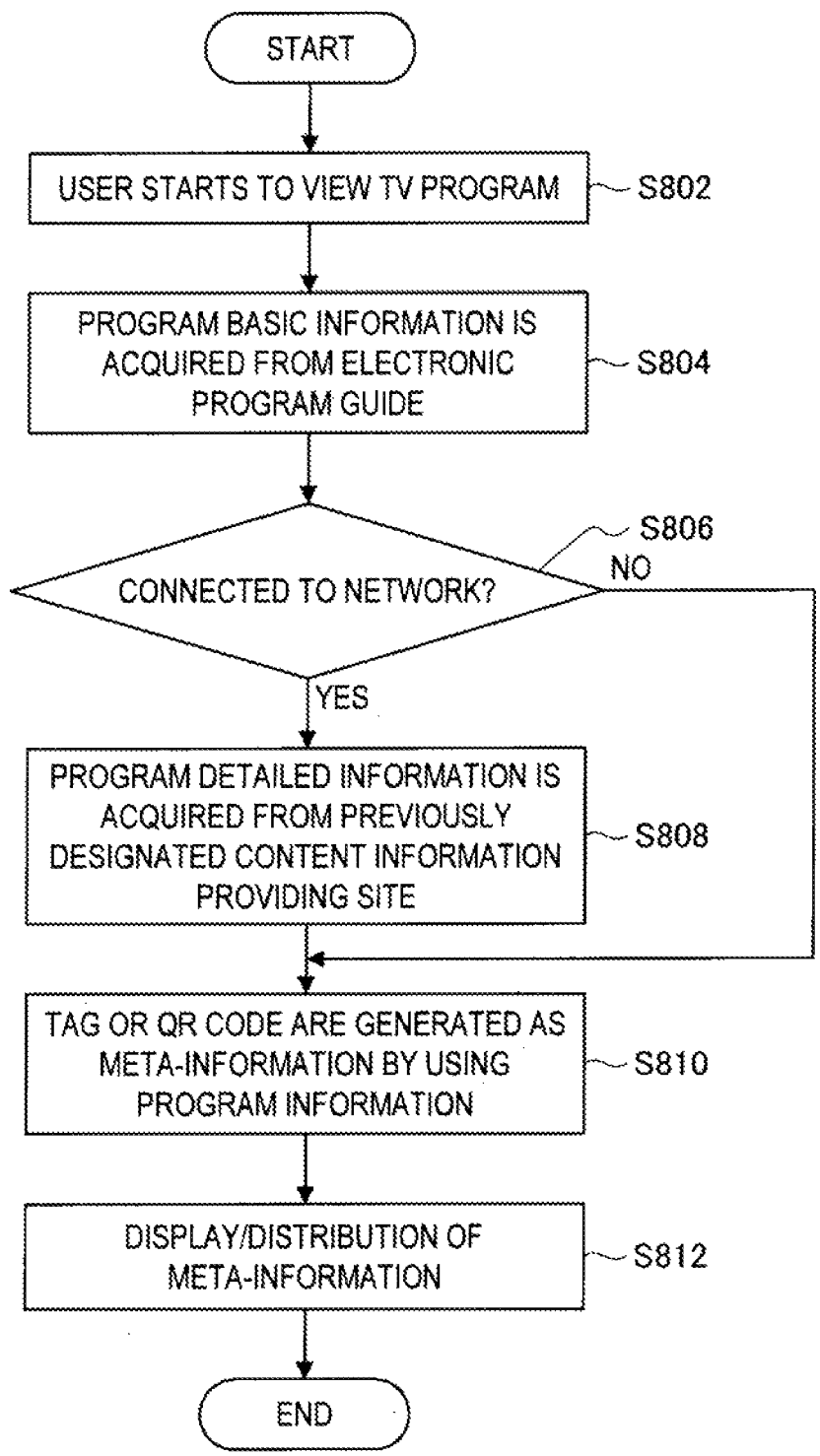
FIG. 8 is a flowchart showing an operation of the content display terminal (TV) consistent with this embodiment.

Next, details of the operation of the TV 100 will be described with reference to a flowchart of FIG. 8. The TV 100 distributes the meta-information of the TV program being viewed at present.

When the user starts to view the TV program (S802), the basic information acquisition part 104 acquires program basic information from an electronic program listing (such as EPC: Electronic Program Guide) (S804: basic information acquisition step). The program basic information includes program names, broadcast channels, broadcast time, performers and the like. The program basic information is an example of the basic information regarding the content.

Next, the control part 114 determines whether the TV 100 is connected to the network 400 (S806), and when it is not connected, processing is immediately advanced to S810. When the TV 100 is connected to the network 400, program detailed information is acquired from a previously designated content information providing site (S808: detailed information acquisition step). The content information providing site includes, for example, an address of a TV station program formal homepage site or an address of a performer site, etc.

In S810, a tag or a QR code is generated as the meta-information by using program information (program basic information, and program detailed information if acquired) (S810: meta-information generation step). The details of the generation processing will be described later.

The generated meta-information is displayed on the display screen of the TV 100 by the meta-information display part 110, or is transmitted to the portable terminal 200 by the meta-information notification part 112 (S812: Meta-information disclosure step). The meta-information may also be displayed on the display screen of the TV 100 by the meta-information display part 110 and also may be transmitted to the portable terminal 200 by the meta-information notification part 112. The meta-information notification part 112 may also generate and/or transmit a sound signal representing the meta-information.

(Generation Example of the Tag)

Figure 9:
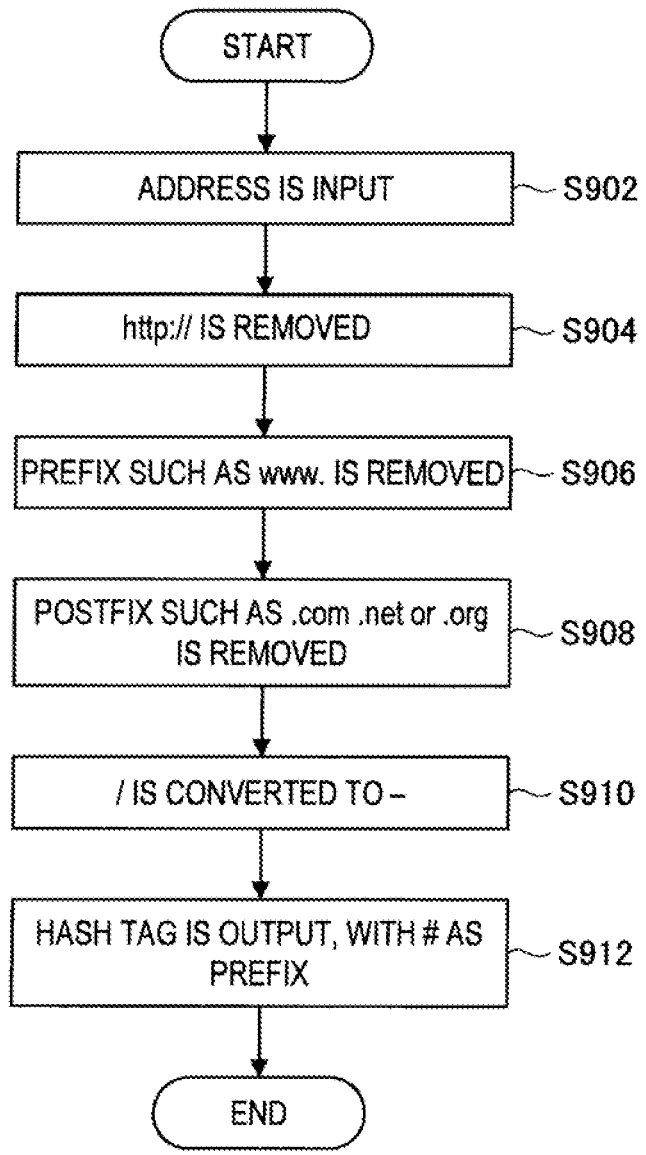
FIG. 9 is a flowchart showing a generating operation of a tag consistent with this embodiment.

Next, a generation processing example of the tag (meta-information) of S810 in FIG. 8 will be described with reference to FIG. 9. First, the meta-information generation part 108 inputs the address for accessing the electronic program guide (S902).

Next, the meta-information generation part 108 removes "http://" from the address (S904), and removes a prefix such as "www." from the address (S906), and further removes a postfix such as ".com " ".net", or ".org" from the address (S908). Next, the meta-information generation part 108 converts "/" to "-" (S910), and outputs a hash tag, with "#" as a prefix (S912).

For example, as an address for accessing the information regarding the TV program, when "http://www.SSStv.com/quiz_show" is input, as a result of the aforementioned processing, "#SSStv-quiz_show" is output as a tag. The TV station is specified by a portion of the tag: "#SSStv", and the name of the TV program is specified by a portion of the tag: "quiz_show". Thus, for example, the tag capable of uniquely specifying the TV program can be generated. URL, being an example of the address, is globally unique data, and therefore even if the tag is generated from the URL of the formal homepage of the program, the content can be uniquely specified from this tag.

(Display Example of the Tag)

Figure 10:
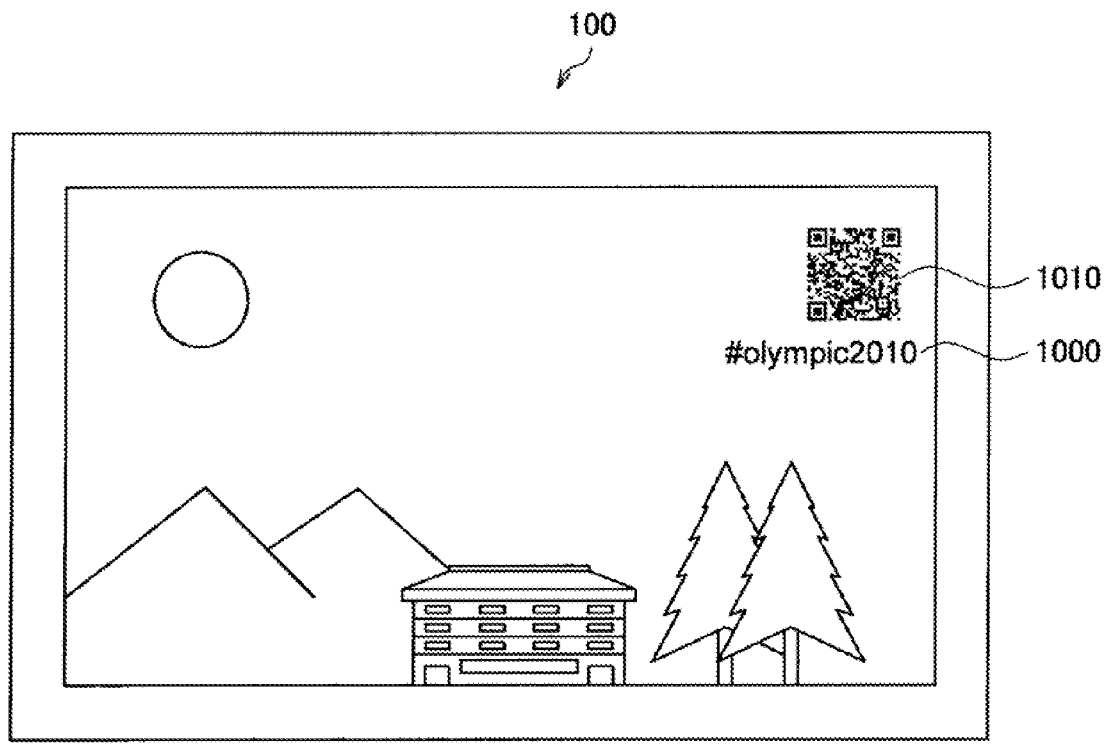
FIG. 10 is a screen display example of the tag consistent with this embodiment.

FIG. 10 shows an example of displaying "#olympic20l0", being other example of a generated tag 1000, and a QR code 1010 obtained by encoding the tag 1000, on the screen of the TV 100. The user can visually read the program information (here, the program information is Olympic information) from the tag 1000. Further, the user can recognize the program information by catching the QR code 1010 by using a camera function of the portable terminal 200. The user can also recognize the program information by receiving the tag 1000 via the network 400.

When the radio communication is difficult, the tag 1000 and the QR code 1010 are only displayed on the screen of the TV 100. However, when the radio communication is possible, the display can be omitted by transmitting the tag 1000 and the QR code 1010 to the portable terminal 200. Of course, the tag 1000 and the QR code 1010 may be displayed on the screen and also may be transmitted to the portable terminal 200. It is necessary that at least either one of the tag 1000 and the QR code 1010 be displayed or transmitted.

(Distribution Example of the Tag)

Figure 11:
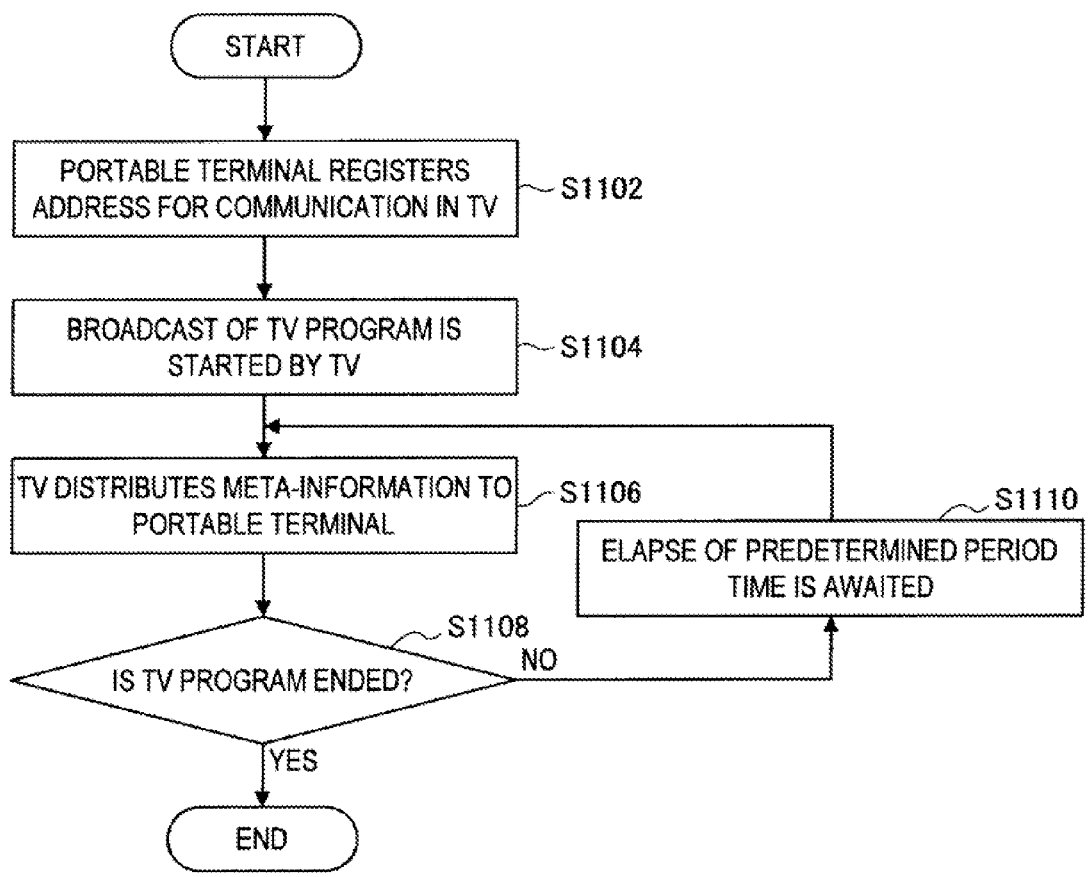
FIG. 11 is a flowchart showing a distributing operation of the tag consistent with this embodiment.

Next, when the radio communication is possible, a distribution example of the tag (meta-information) of S812 in FIG. 8 will be described with reference to FIG. 11. First, the portable terminal 200 registers the address for communication in the TV 100 (S1102). The broadcast of the TV program in the TV 100 is started (S1104). The meta-information notification part 112 gives a command to the communication part 102, so as to distribute the meta-information to the portable terminal 200 (S1106). The distribution may be a unicast transmission to one portable terminal 200, or may be a broadcast transmission to a plurality of portable terminals 200.

The meta-information notification part 112 determines whether the TV program is ended (S1108), and when it is ended, the processing is ended as it is, while when it is not ended, after elapse of a specified time (S1110), the meta-information is distributed again (S1106). As described above, processing of distributing the meta-information (tag) is repeated while viewing the broadcast of the TV 100 (while adjusting a channel), for example, every 1 minute (S1106 to S1110).

[Operation of the Portable Terminal]

Figure 12:
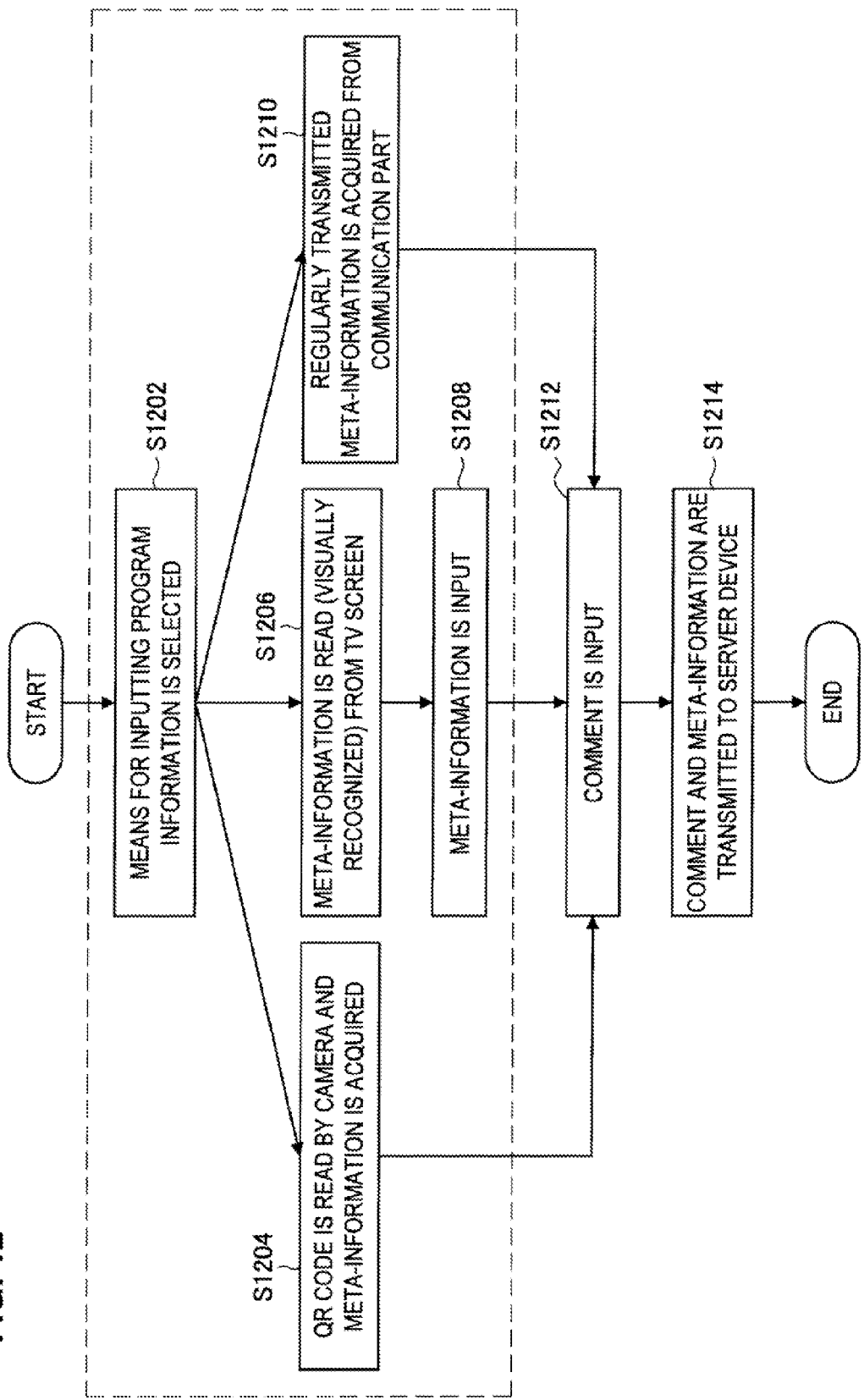
FIG. 12 is a flowchart of the portable terminal consistent with this embodiment.

Next, details of the operation of the portable terminal 200 will be described with reference to a flowchart of FIG. 12. The portable terminal 200 performs posting of the comment by using the meta-information (tag) provided from the TV 100. By posting the comment on the server device 300, the portable terminal 200 can convey, to the server device side, behavioral data such as "a certain TV program is not only displayed on the screen but actually viewed" by the user who performs posting of the comment, and further accurate totaling of the audience rating can be realized by the server device 300 side.

As shown in S1202, the meta-information acquisition part 204 selects a means for inputting the program information consistent with the operation of the user, out of input methods shown in S1204 to S1210. The acquisition method of the meta-information is roughly divided into two kinds of a method of acquiring it from the screen of the TV 100, and a method of acquiring it by communication (meta-information acquisition step). Either one of the methods of caching the meta-information displayed on the screen by reading the QR code by a camera (S1204), and visually recognizing the meta-information displayed on the screen of the TV 100 (S1206) to catch characters or symbols thus recognized by inputting them by using a keyboard or buttons, etc., (S1208), can be considered. When the communication is used, the meta-information regularly distributed from the TV 100 is acquired by the communication part 202, and is automatically registered in the application (S1210).

The input part 206 inputs the comment regarding the TV program being viewed, consistent with an instruction of the user (S1212: input step). The communication part 202 transmits to the server device 300 the input comment and the acquired meta-information which are paired (S1214: comment transmission step).

(Input Example of the Comment and the Tag)

Figure 13:
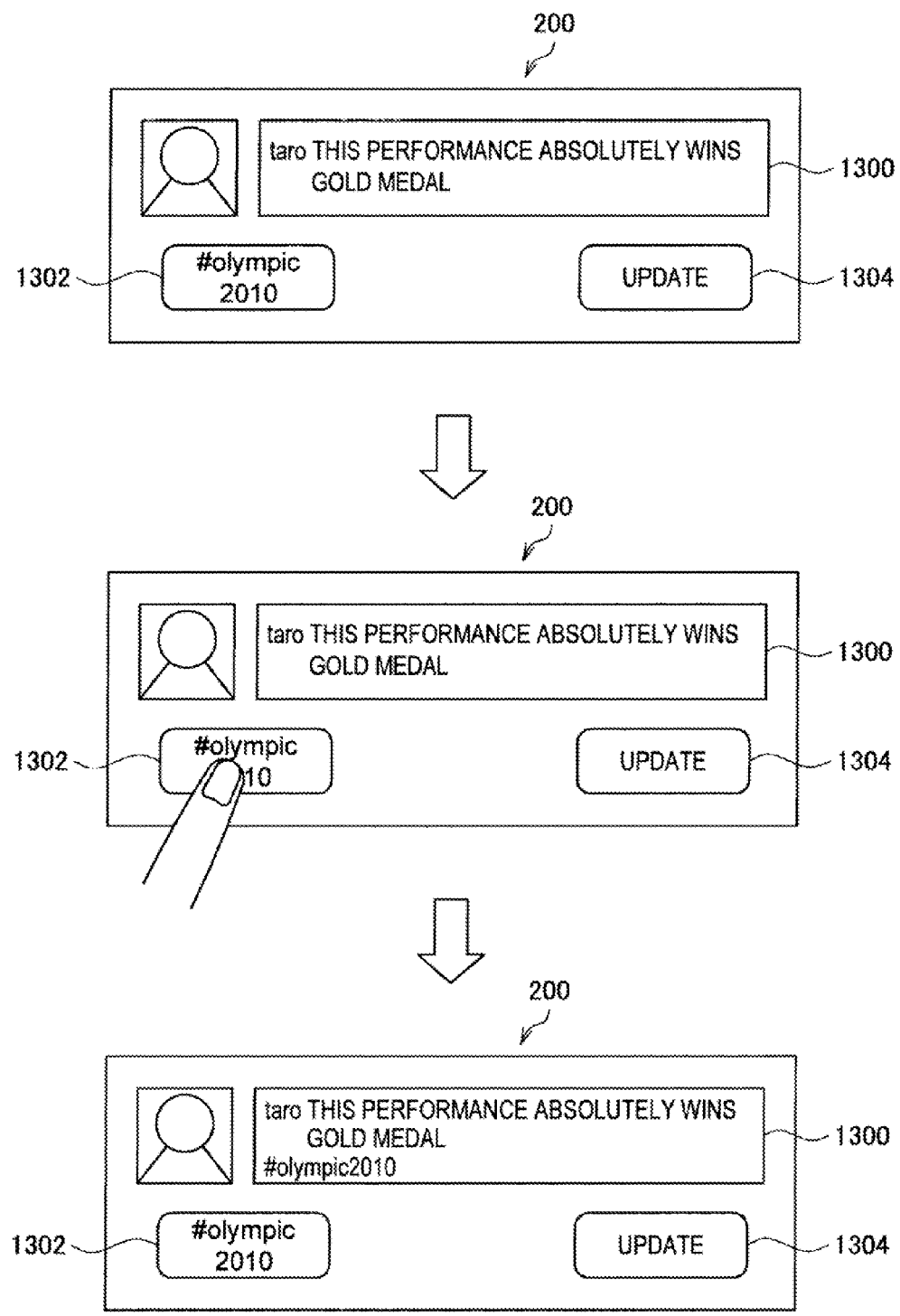
FIG. 13 is a flowchart showing an input operation of the portable terminal consistent with this embodiment.

FIG. 13 shows an example of adding the tag to the comment on the display screen of the portable terminal 200. As shown in this figure, the user (for example, Taro) inputs comment 1300 such as "this performance absolutely wins a gold medal" regarding an Olympic program being viewed. In a central figure, the user (Taro) presses a button 1302 showing the tag of "#olympic2010" regarding the previously input comment 1300. As a result, as shown in the figure below, the tag of "#olympic2010" is added to the comment 1300. Thus, the comment and the tag are posted on the server device 300 with the tag added to the comment, and therefore it can be uniquely specified that the comment 1300 such as "this performance absolutely wins a gold medal" is the comment regarding the Olympic program shown by the tag:"#olympic2010". Note that an update button 1304 is used for updating the screen.

Here, the comment and the tag are associated with each other, and therefore the user does not have to input, to the comment, the meta-information (tag) for specifying the TV program. Accordingly, the portable terminal 200 can use the tag previously generated by the TV 100, and can uniquely specify the TV program, being a commented object, without much trouble. Further, when the user individually inputs, to the comment, the meta-information for specifying the TV program, there is a possibility that there is a variation in the specified TV program among users, and the comment and the TV program may not be uniquely specified. However, consistent with this embodiment, the user uses the tag which is uniquely generated as the meta-information for specifying the TV program, and therefore no variation occurs in the specified TV program among users.

[Operation of the Server Device]

Figure 14:
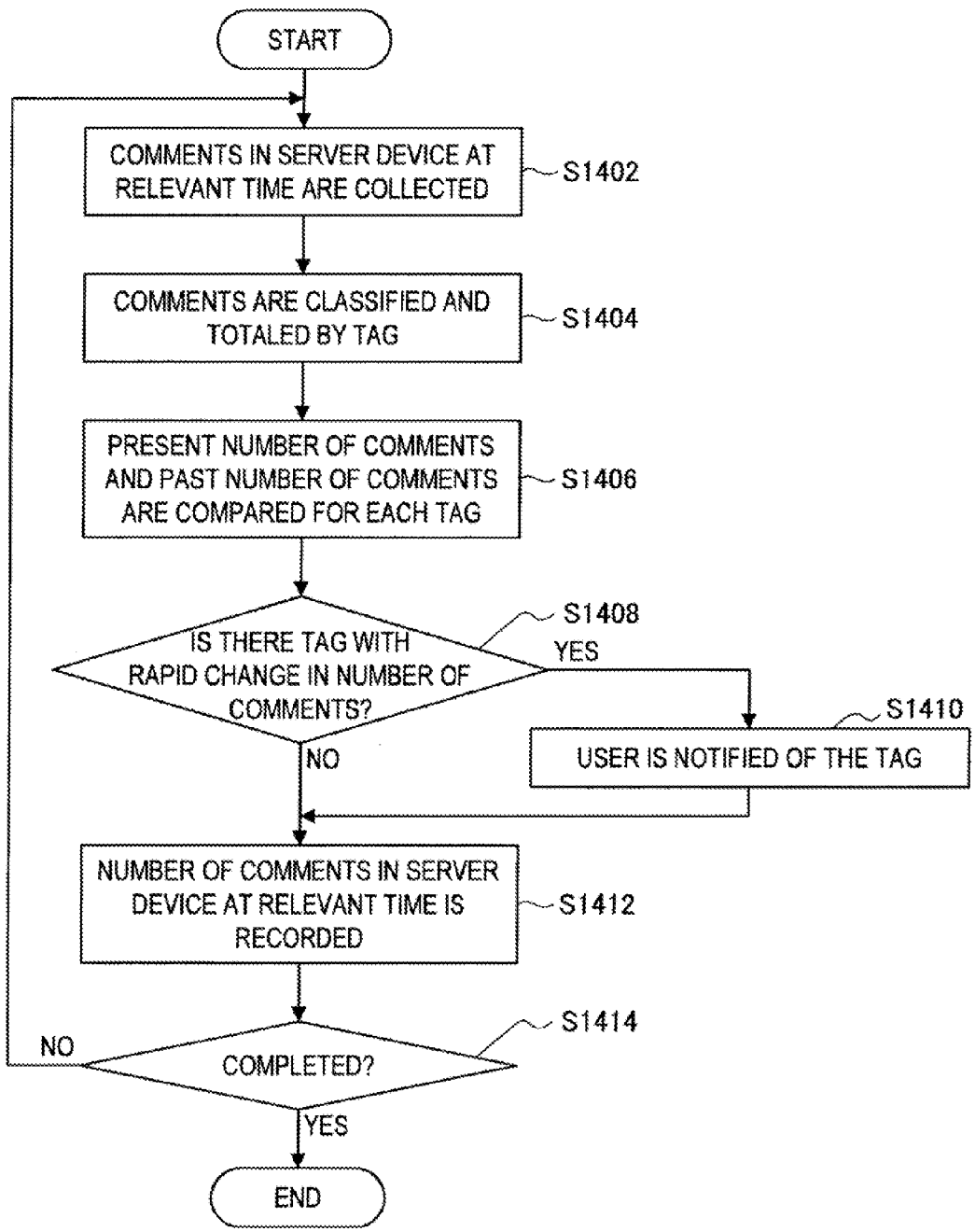
FIG. 14 is a flowchart of the sever device consistent with this embodiment.

Next, details of the operation of the server device 300 will be described with reference to a flowchart of FIG. 14. The server device 300 performs totaling of the comment provided from the portable terminal 200, and based on its totaling result, improves an accuracy of an actual audience rating (active audience rating), and provides a mechanism of utilization to the communication among users. For example, the number of comments is totaled for each tag, and when the number of comments being totaled at present is rapidly changed compared with a past totaling result, the user is notified of this matter.

First, the totaling part 304 collects the comments in the server device at a relevant time, which is received from the communication part 302 (S1402). The totaling part 304 performs classifying and totaling of the number of comments for each tag (S1404: totaling step). Next, the totaled number of comments for each tag and the number of comments for each same tag which is totaled in the past, are compared (S1406). As a result of comparison, when there is a tag having rapid change in the number of comments (S1408), the user is notified of this tag by displaying the tag on the display screen of the TV 100 together with the comment, or by transmitting the tag to the portable terminal 200 via the network 400 (S1410: totaling result notification step). When there is no tag having rapid change in the number of comments, S1410 is skipped.

The number of comments for each tag in the server device at the relevant time is stored (S1412), then whether there are other comments to be totaled is determined (S1414), and in a case of no comments, the processing is ended. When there are other comments to be totaled, the processing is returned to S1402, and the processing of S1402 to S1414 is repeated.

FIG. 15 is an example of database 312 storing a result of totaling by the server device 300. As described above, when the comments are received, the server device 300 classifies the comments for each tag as shown in FIG. 15, and stores them in the database 312. The database 312 stores a program tag 314, totaling start time 316, totaling end time 318, and a minimum number of comments 320. A totaling time may be set as an arbitrary interval, and for example totaling is performed at 5 minutes interval.

FIG. 16 shows another example of the database 312 storing the result of totaling by the server device 300. The database 312 stores a user ID 322, a program tag 314, and a minimum number of comments 324.

Figure 17:
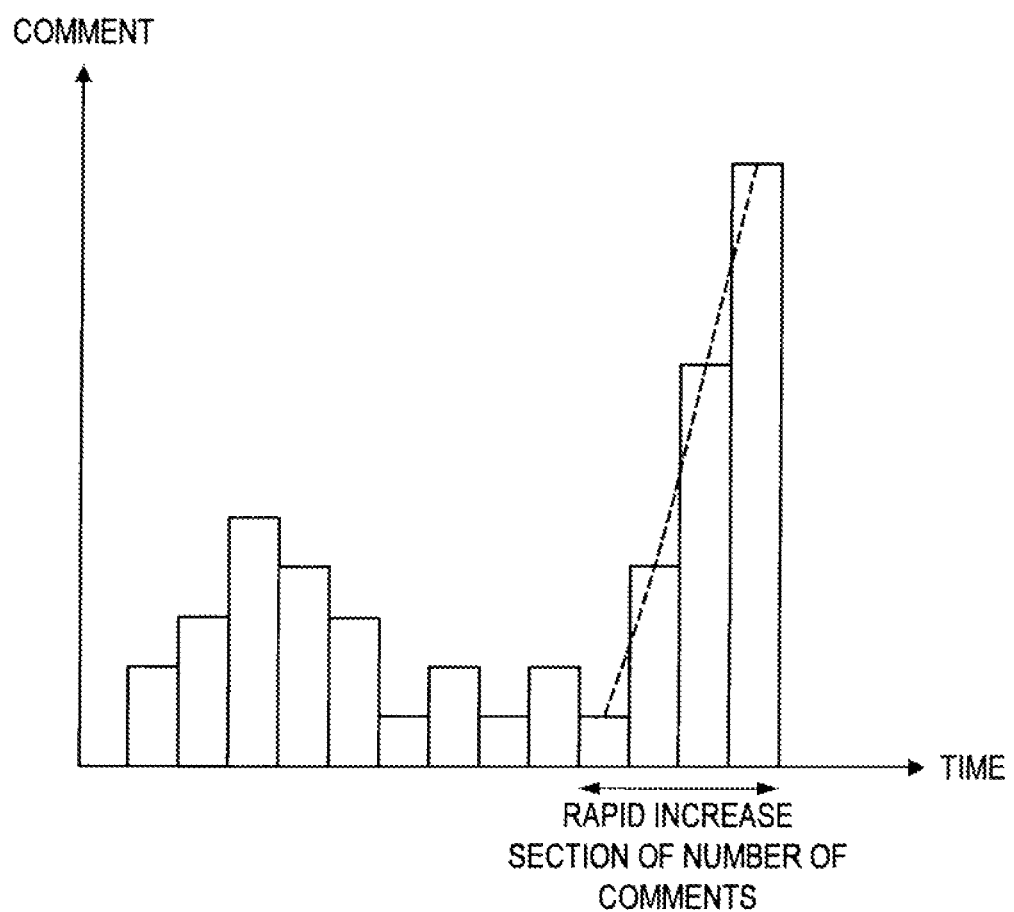
FIG. 17 is an example showing increase/decrease in the number of comments.

Based on the totaling result, the server device 300 improves the audience rating and encourages the utilization to the communication. Specifically, as described above, the server device 300 researches the number of comments in the database for each tag, and compares it with the past number of comments for each tag. Here, as shown in FIG. 17, if there is a rapid increase (or decrease) in the number of comments, the user is notified of the TV program specified by this tag. As a standard of determining the rapid increase, for example, a moving average of several number of times in the past is calculated, and when the number of comments greatly exceeds the moving average, the user is notified of the TV program specified by this tag.

(Totaling Result Display Example)

Figure 18:
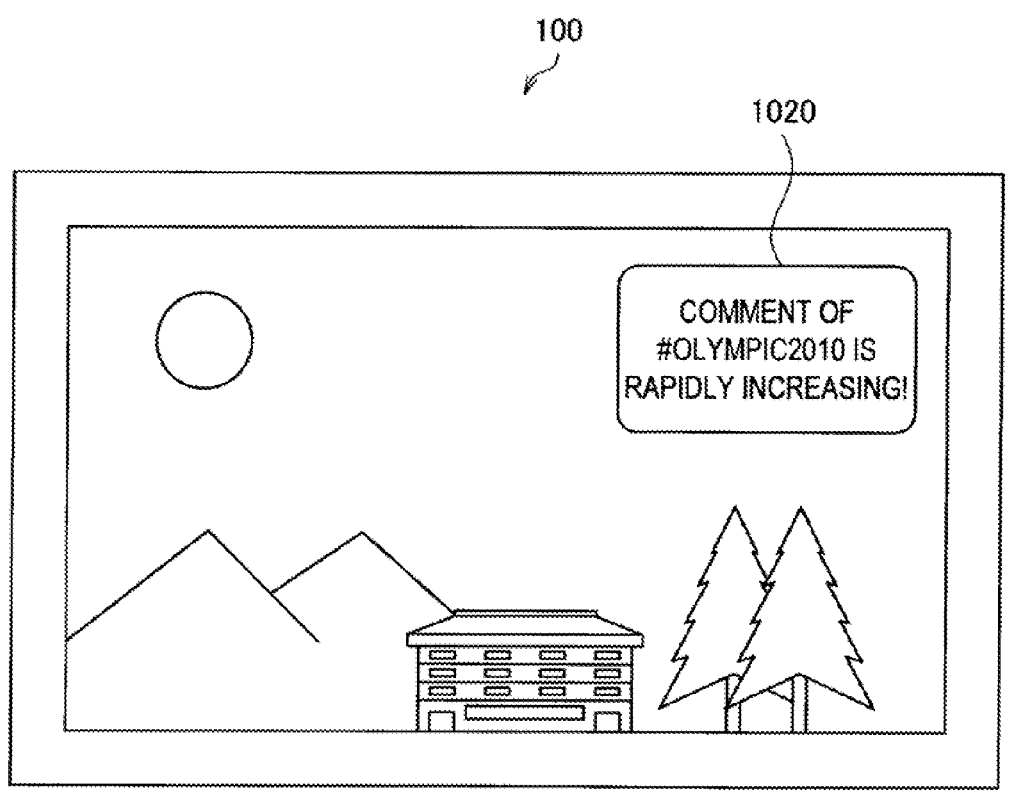
FIG. 18 is a screen display example of a notification of totaling results consistent with (his embodiment.

FIG. 18 shows a state of notifying the user of the increase in the number of comments of the specific TV program, through the display of the TV 100, when the number of comments is rapidly increased. When display 1020 such as "Comments of #olympic2010 are rapidly increased!" is displayed while viewing the program, the user clicks the display 1020. As a result, the display content of the TV 100 (broadcast program) is switched to an Olympic program.

The information regarding the TV program recommended or not recommended, with the increase/decrease in the number of comments, is distributed from the server device 300 and is received by at least either one of the portable terminal 200 and the TV 100. Note that here, an example of recommendation by the number of comments is shown. However, a modified example can also be considered, in which the number of users who have performed posting of the comments within a prescribed time, and the total number of characters of the comments within the prescribed time, and a variation by combination of them, are taken as a variation of interests of the users, which is then utilized for the notification to the users.

As described above, consistent with the information providing system 10 of this embodiment, the user can easily or unintentionally use the meta-information regarding the program being viewing, for the application. In the transmission of the information (posting of the comment) from the user, the meta-information for specifying the program information is transmitted together with the comment, and therefore by totaling the number of posting of comments at the side of the server device, an accurate audience rating (active audience rating) showing that the user actively views the program, can also be calculated.

As a method of researching the TV program being viewed by the user, measurement of the audience rating by using a specific device has been generally used heretofore, and therefore the number of users who are viewing the program actively has not been grasped.

Although a device for measuring and totaling the audience rating exists in the past, even when the program, which is turned on incidentally, is not viewed actually, the audience rating thereof is counted only by the fact that the program is displayed on the screen, thus becoming far removed from the realities of the present situation in some cases.

For example, in a device for totaling the audience rating disclosed in Japanese Patent Application Laid-Open No. 2010-34674, a TV program viewing action rate is calculated by a searching state of the TV program being viewed. However, as long as the program is not searched by using a keyword while browsing the TV program, the viewing action rate may not be calculated. Further, for example, in a system disclosed in Japanese Patent Application Laid-Open No. 2008-199373, a highly accurate audience rating can be obtained by deriving the audience rating by calculating an access rate distributed from a content server device while viewing only a stream of summary of moving picture contents. However, in this system, it might be necessary to prepare a special content server device for calculating the audience rating.

Web-based services include a site for writing a live coverage of the TV program. The audience rating of the program can also be calculated from the information written into this site. However, such a system depends on a specific service such as a live coverage service.

Meanwhile, consistent with this embodiment, by performing posting of the comment from the portable terminal 200 without using a specific device or a specific service and without depending on the specific device or the specific service, the user who performs posting of the comment can notify. the server device 300 of behavioral data such as "viewing a certain program", and totaling of further accurate audience rating can be realized by the server device 300. Further, when it is determined that the audience rating of the special program is rapidly increased based on the accurate totaling result, notification for recommending this special program is transmitted to the portable terminal 200 and the TV 100 from the server device 300, and therefore the user can instantaneously know a popular program in real time.

(Addition of Time Information)

Note that in the above explanation, the meta-information (tag or QR code) includes content specifying information (program information) for specifying the content displayed on the TV 100. However. the meta-information may also include time information regarding the content, in addition to the content specifying information. For example, the meta-information: "#olympic2010%20100323 19:00" may be generated so as to include content specifying information: "#olympic2010" and time information regarding the content: "%2100323 19:00". Thus, even at the side of the portable terminal, it is found which program gets a comment and what time the comment is got, and also at the server device as well, the audience rating can be totaled in a further fine unit.

In the aforementioned embodiment, an operation of each part is mutually related, and the operation can be replaced with a series of operation and a series of processing in consideration of the mutual relation. Thus, embodiments of the information providing method executed by the content display terminal (TV), the portable terminal, and the server device respectively, can be set as the embodiment of the information providing system, and the embodiment of the program for making functions of the content display terminal (TV), the portable terminal, and the server device realized by a computer.

It should be understood by those skilled in the art that various modifications, combinations, sub-combinations and alterations may occur depending on design requirements and other factors insofar as they are within the scope of the appended claims or the equivalents thereof.

For example, not only a video but also a voice is included in the content. Therefore, the present invention can be applied, for example, to a case that the meta-information is also added to the comment of a radio program while listening to the radio.

Further, by using a technique of analyzing the content of the comment, positive or negative number of comments regarding the program can also be grasped. A service of associating the TV program and the comment of the user exists heretofore, like an online TV live coverage service. However, the present invention can be applied without depending on a specific device or a specific service.

What is claimed is:

1. A computer-implemented method for providing information to a user, comprising:
   providing, on an output device, program content;
   generating, by a processor, descriptive data including identification information corresponding to the program content;
   providing a notification to a user based on the descriptive data, the notification corresponding to the program content;
   receiving, in response to the notification, comments of users corresponding to the program content, the received comments being associated with the identification information;
   calculating a summation result based on a number of comments associated with the identification information;
   comparing the calculated summation result with a predetermined summation result; and
   providing a result of the comparison when a difference between the calculated summation result and the predetermined summation result is greater than a threshold.

2. The method of claim 1, wherein providing the notification includes at least one of generating a sound signal, providing a representation of the descriptive data, displaying the descriptive data, or transmitting the descriptive data to a user device via a network.

3. The method according to claim 2, wherein transmitting the descriptive data includes providing the descriptive data periodically to the user device and after elapse of predetermined period of time.

4. The method of claim 1, further comprising:
   associating the user comments with the program content by associating the identification information with an identifier of the users.

5. The method of claim 1, wherein generating the descriptive data includes generating a tag based on at least one of time information associated with the program content, an address associated with the program content, or information regarding the content obtained via a network.

6. The method of claim 5, further comprising:
encoding the tag; and
including the encoded tag in the notification.

7. The method of claim 1, further comprising:
outputting the notification to a user, the notification including the identification information; and
receiving, from a user device, the identification information and user data conveying a comment of the user corresponding to the program content.

8. The method of claim 1, wherein the program content includes at least one of pre-recorded data, audio/video data, live transmission data, or streaming data.

9. The method of claim 1, wherein the notification is provided to a user device, the user device being one of a mobile phone, a music player, a handheld computer, a navigation system, or a personal digital assistant.

10. An apparatus for providing information to a user, comprising:
an output device for providing program content; and
a processor for:
generating descriptive data including identification information corresponding to program content;
providing a notification to a user based on the descriptive data, the notification corresponding to the program content;
receiving, in response to the notification, comments of users corresponding to the program content, the received comments being associated with the identification information;
calculating a summation result based on a number of comments associated with the identification information;
comparing the calculated summation result with a predetermined summation result; and
providing a result of the comparison when a difference between the calculated summation result and the predetermined summation result is greater than a threshold.

11. An apparatus for providing information to a user, comprising:
a memory device storing instructions;
a processing unit executing the instructions to receive descriptive data generated by a device outputting program content, the descriptive data including identification information corresponding to the program content; and
a communication unit for
sending user data conveying a comment of the user corresponding to the program content, the user data including the identification information; and
receiving a result of a comparison when a difference between a summation result obtained by a calculation based on a number of comments associated with the identification information and a predetermined summation result is greater than a threshold.

12. The apparatus of claim 11, wherein the user data is associated with the program content by associating the identification information with an identifier of a user.

13. The apparatus of claim 11, wherein generating the descriptive data includes generating a tag based on at least one of time information associated with the program content, an address associated with the program content, or electronic programming guide information.

14. The apparatus of claim 11, wherein the summation result is calculated based on comments of a plurality users corresponding to the program content.

15. A tangibly embodied non-transitory computer-readable storage medium comprising instructions, which when executed on a processor, cause the processor to perform a method for providing information to a user, the method comprising:
providing program content;
generating descriptive data including identification information corresponding to the program content; and
providing a notification to a user based on the descriptive data, the notification corresponding to the program content;
receiving, in response to the notification, comments of users corresponding to the program content, the received comments being associated with the identification information;
calculating a summation result based on a number of comments associated with the identification information;
comparing the calculated summation result with a predetermined summation result; and
providing a result of the comparison when a difference between the calculated summation result and the predetermined summation result is greater than a threshold.

16. An apparatus for receiving user data, comprising:
a memory device storing instructions;
a processing unit executing the instructions to receive user data and descriptive data including identification information corresponding to a program content, the user data conveying comments of a plurality of users corresponding to the program content;
a summation unit calculating a summation result based on comments of the plurality users corresponding to the program content;
a comparison unit for comparing the summation result with a predetermined summation result; and
an output unit outputting a result of the comparison when a difference between the calculated summation result and the predetermined summation result is greater than a threshold.

* * * * *